(12) United States Patent
Gouda

(10) Patent No.: US 11,971,813 B2
(45) Date of Patent: *Apr. 30, 2024

(54) DATA DRIVEN TESTING AUTOMATION USING MACHINE LEARNING

(71) Applicant: Allstate Solutions Private Limited, Bangalore (IN)

(72) Inventor: Pavan N. Gouda, Bangalore (IN)

(73) Assignee: Allstate Solutions Private Limited, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,165

(22) Filed: May 22, 2023

(65) Prior Publication Data

US 2023/0376406 A1    Nov. 23, 2023

Related U.S. Application Data

(63) Continuation of application No. 16/868,046, filed on May 6, 2020, now Pat. No. 11,748,239.

(51) Int. Cl.
  *G06F 11/36* (2006.01)
  *G06F 21/62* (2013.01)
  *G06N 20/00* (2019.01)

(52) U.S. Cl.
  CPC ...... *G06F 11/3688* (2013.01); *G06F 21/6245* (2013.01); *G06N 20/00* (2019.01)

(58) Field of Classification Search
  USPC ........................................................ 706/11
  See application file for complete search history.

(56) References Cited

U.S. PATENT DOCUMENTS

| 7,318,051 B2 | 1/2008 | Weston et al. |
| 9,898,393 B2 | 2/2018 | Moorthi et al. |

(Continued)

FOREIGN PATENT DOCUMENTS

| CN | 109634872 A | 4/2019 |
| CN | 109828905 A | 5/2019 |
| WO | 2019067747 A9 | 5/2019 |

OTHER PUBLICATIONS

Patil, "An Evolutionary Approach for Software Defect Prediction on High Dimensional Data Using Subspace Clustering and Machine Learning", 2005, Journal of Theoretical and Applied Information Technology (Year: 2005).*

(Continued)

*Primary Examiner* — Hossain M Morshed
(74) *Attorney, Agent, or Firm* — Dinsmore & Shohl LLP

(57) ABSTRACT

Aspects of the disclosure relate to computing platforms that implement data driven testing through automation using continuous machine learning combined with continuous integration for development testing. A computing platform may extract production data from user interaction with an application, perform a masking operation on the production data to create modified production data, convert the modified production data into a format suitable for machine learning, and generate one or more independent scenarios using machine learning. The computing platform may automatically trigger execution of test scripts associated with the one or more independent scenarios using the modified production data and receive results of the executed test scripts indicating whether a version of the application performs as expected.

20 Claims, 7 Drawing Sheets

(56) References Cited

U.S. PATENT DOCUMENTS

| | | | |
|---|---|---|---|
| 10,055,339 B2 | 8/2018 | Bhojan | |
| 10,073,763 B1* | 9/2018 | Raman | G01R 31/31835 |
| 10,366,420 B2 | 7/2019 | Aydin et al. | |
| 10,417,115 B1 | 9/2019 | Klein et al. | |
| 10,467,220 B2 | 11/2019 | Li et al. | |
| 10,474,561 B2 | 11/2019 | Bhojan | |
| 10,534,701 B1 | 1/2020 | Pande et al. | |
| 11,127,403 B2* | 9/2021 | Medalion | G06F 40/30 |
| 11,194,596 B2* | 12/2021 | Kebets | G06F 18/217 |
| 11,263,003 B1* | 3/2022 | Gan | G06F 16/219 |
| 11,748,239 B1* | 9/2023 | Gouda | G06N 7/01 |
| | | | 706/11 |
| 2017/0032281 A1 | 2/2017 | Hsu | |
| 2018/0074944 A1* | 3/2018 | Hirt | G06F 8/34 |
| 2018/0129971 A1* | 5/2018 | Vlassis | G06N 20/00 |
| 2018/0275970 A1 | 9/2018 | Woulfe et al. | |
| 2018/0364985 A1 | 12/2018 | Liu et al. | |
| 2019/0050322 A1* | 2/2019 | Bhojan | G06N 20/00 |
| 2019/0138300 A1 | 5/2019 | Burli et al. | |
| 2019/0266023 A1 | 8/2019 | Buil et al. | |
| 2019/0317885 A1 | 10/2019 | Heinecke et al. | |
| 2019/0340512 A1 | 11/2019 | Vidal et al. | |
| 2020/0005191 A1 | 1/2020 | Ganti et al. | |
| 2020/0034279 A1 | 1/2020 | Shivam et al. | |
| 2020/0117583 A1* | 4/2020 | Durairaj | G06F 11/3692 |
| 2021/0110299 A1* | 4/2021 | Bisson-Krol | G06F 18/2178 |
| 2021/0304044 A1* | 9/2021 | Nagarajan | G06N 7/01 |
| 2021/0357531 A1* | 11/2021 | Pechersky | H04L 67/535 |
| 2022/0012814 A1* | 1/2022 | Crabtree | G06N 5/045 |
| 2022/0019691 A1* | 1/2022 | Beloussov | G06Q 10/10 |
| 2022/0019692 A1* | 1/2022 | Beloussov | G06N 20/00 |
| 2022/0083458 A1* | 3/2022 | Shang | G06V 20/44 |

OTHER PUBLICATIONS

Sadiq, Saif, "Machine Learning for Automation Testing," DZone: AI Zone Opinion, Jul. 2, 2018, 3 pages.

Levinger, David, "Six Steps to Master Machine Learning with Data Preparation," KDnuggets News, Dec. 2018, Tutorials, Overviews, 4 pages.

Kuflinski, Yaroslav, "UI Testing Powered by Machine Learning: A Fad or a Feasibile Opportunity?," iFlexion Blog, Jun. 14, 2018, 5 pages.

Patil, et al., "An Evolutionary Approach for Software Defect Prediction on High Dimensional Data Using Subspace Clustering and Machine Learning," Joural of Theoretical and Applied Information Technology, Nov. 15, 2019, vol. 97, No. 21, pp. 2994-3002.

Herczeg, Andras, "Continuous Integration in Machine Learning: Towards fully automated continuation learning," University of Amsterdam, Master of Software Engeineering Thesis, Jul. 11, 2018, 50 pages.

Anonymous, "Continuous Integration System that Leverages Machine Learning to Diagnose Build Failures", 2013, IP.com, (Year: 2013).

Schenk, "An Introduction to Continuous Integration and Testing", 2019, https://www.functionize.com/blog/continuous-integration-how-it-affects-testing (Year: 2019).

Choi, "Comparative Analysis of Electricity Consumption at Home through a Silhouette-score prospective", 2019, IEEE (Year: 2019).

Patil, "An Evolutionary Approach for Software defect prediction on high dimension data using subspace clustering and machine learning", 2019, Journal of Theoretical and applied Information Technology (Year: 2019).

* cited by examiner

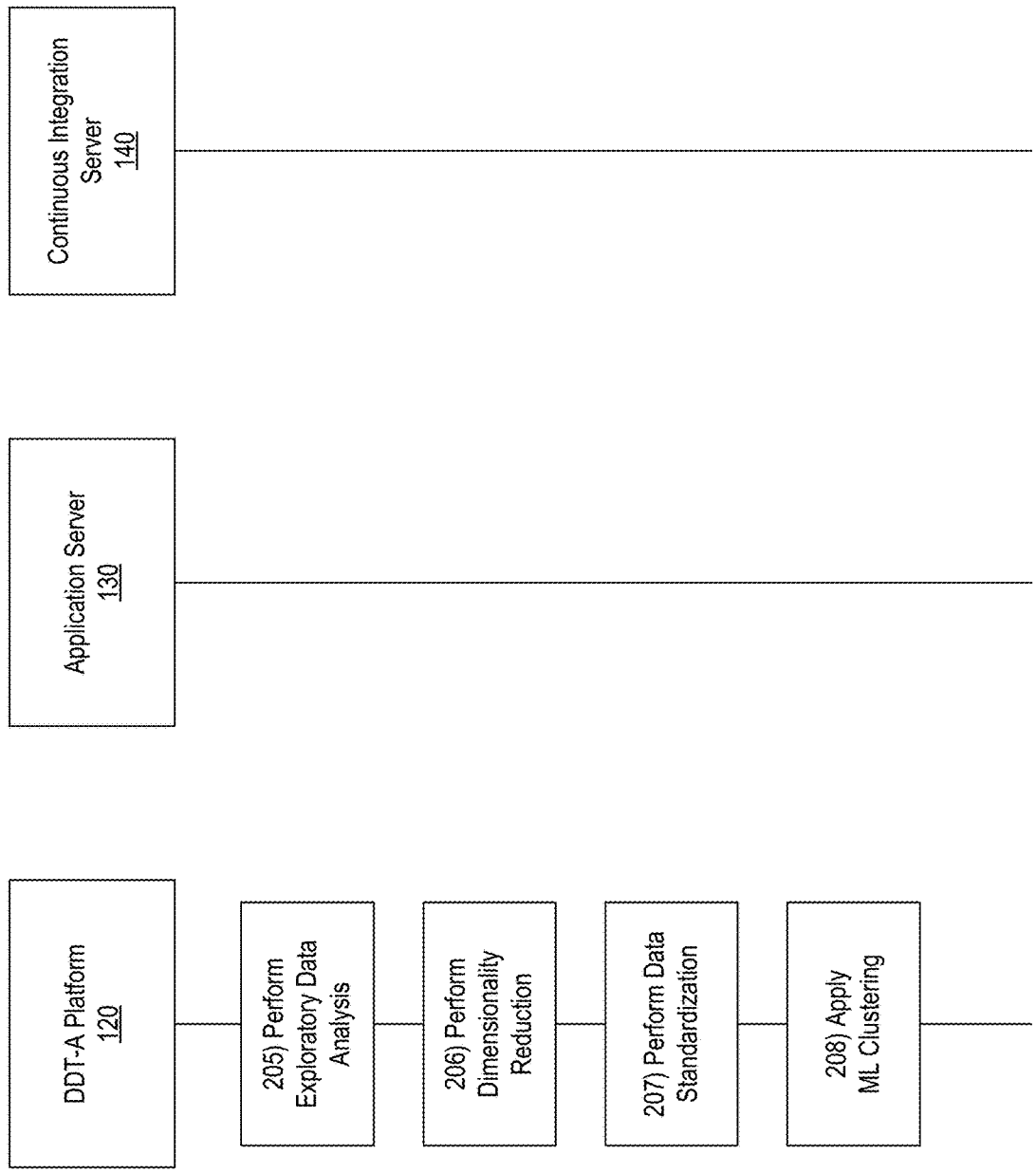

DATA DRIVEN TESTING AUTOMATION USING MACHINE LEARNING

CROSS-REFERENCE TO RELATED-APPLICATIONS

This application is a continuation of U.S. application Ser. No. 16/868,046 filed May 6, 2020, and is incorporated herein by reference in its entirety.

BACKGROUND

Aspects of the disclosure relate to development testing and more specifically to data driven testing automation using continuous machine learning and continuous integration. Software development may include the development of an entirely new application or program, or the addition of a new feature to an existing application. For every new build, regression automation scripts may be executed to ensure that an application functions and performs as designed. Since developers are continuously releasing newer versions of software, the process of creating a list of scenarios and manually generating input data for testing every time an update occurs can be challenging.

SUMMARY

Aspects of the disclosure provide effective, efficient, scalable, and convenient technical solutions that address and overcome the technical problems associated with data driven testing. In accordance with one or more arrangements discussed herein, a computing platform having at least one processor, a communication interface, and memory may extract production data from user interaction with an application. The computing platform may perform a masking operation on the production data to create modified production data. The computing platform may convert the modified production data into a format suitable for machine learning. The computing platform may generate one or more independent scenarios using machine learning, including applying a machine learning clustering algorithm to the modified production data. In these arrangements, the clustering algorithm may divide the modified production data into one or more clusters or groupings of data representing the one or more independent scenarios. The computing platform may automatically trigger execution of test scripts associated with the one or more independent scenarios using the modified production data. The computing platform may receive results of the executed test scripts indicating whether a version of the application performs as expected or desired.

In one or more instances, the computing platform may perform the masking operation by removing personally identifiable information (PII) from the production data. In one or more instances, the computing platform may convert the modified production data from a JavaScript Object Notation (JSON) format into a flat file format suitable for machine learning. In one or more instances, the production data includes user input data associated with one or more insurance products.

In one or more examples, the machine learning steps used in generating the one or more independent scenarios may include performing exploratory data analysis, dimensionality reduction, and/or data standardization on the modified production data. In one or more instances, the machine learning clustering algorithm to be applied is determined based on a silhouette ratio score. In one or more arrangements, the computing platform may output a visual representation of the one or more clusters of data on a display screen.

In one or more instances, the execution of the test scripts may include testing a version of the application using a continuous integration tool. In one or more instances, the continuous integration tool includes Jenkins. In one or more instances, the computing platform may receive notification of one or more defects found during the execution of the test scripts.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for automated data driven testing using continuous machine learning combined with continuous integration in accordance with one or more example arrangements discussed herein;

DETAILED DESCRIPTION

Figure 1A:
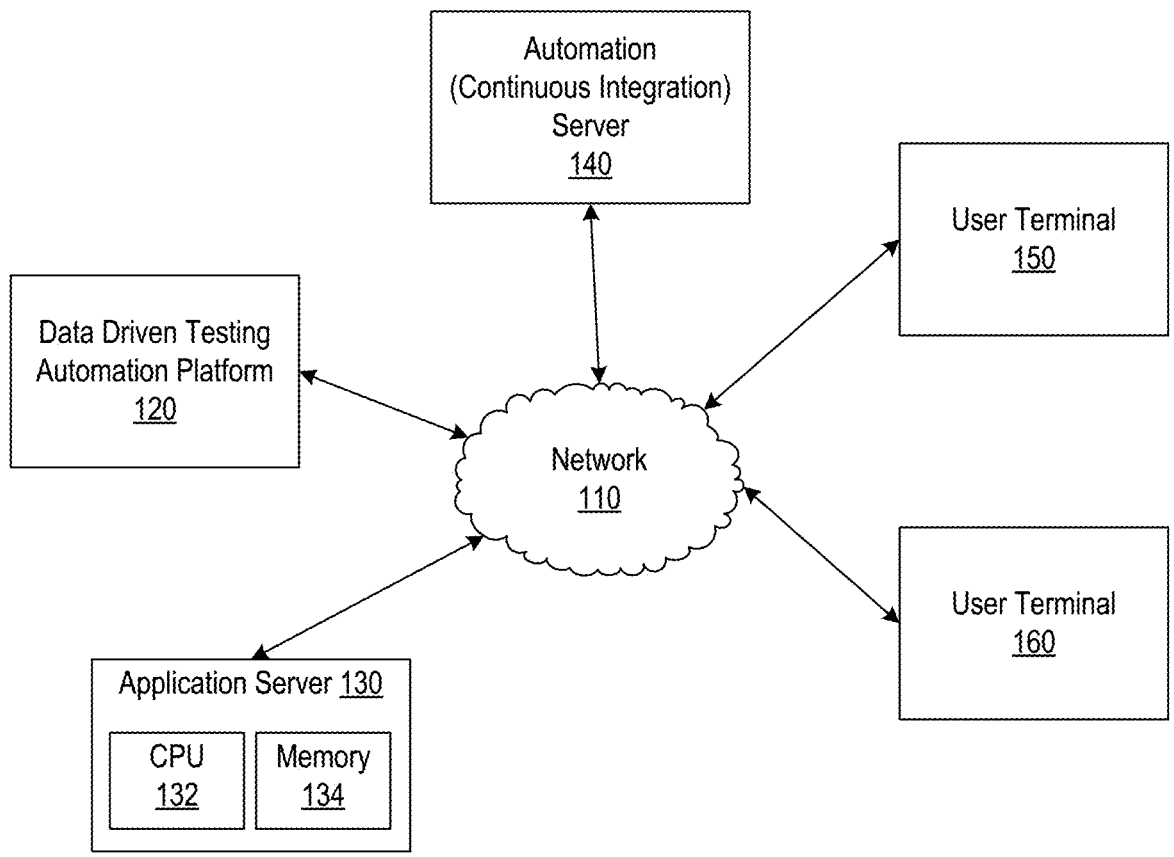
FIGS. 1A and 1B depict an illustrative computing environment for automated data driven testing using continuous machine learning combined with continuous integration in accordance with one or more example arrangements discussed herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

Prior to the release of an application, changes to the application may be made based on different enterprise requirements, or new products may be added. When a new version or newer features of an application is available, steps may be taken to ensure that the new version or features (e.g., adding a new text box) do not tamper with older (e.g., previous version) functions and have not broken or disabled older working features of the application.

As a brief summary, the present disclosure provides systems and methods for leveraging continuous (machine) learning together with continuous integration (also referred to respectively as "CL" and "CI", and together as "CL/CI") to automatically generate scenarios on a regular basis for data driven testing automation. In short, a computing platform may utilize continuous machine learning and development testing techniques to deliver code changes more reliably. The CL/CI approach enables the computing platform to use machine learning clustering algorithms to generate unique or independent scenarios from production data and to use modified production data to execute the unique or independent scenarios in test environments. The CL/CI approach ensures that new scenarios are automatically captured without requiring user intervention or input, or specialized knowledge about a particular system or application. In doing so, the systems and methods described herein may improve efficiency and reliability of software testing. Accordingly, the described systems and methods will ultimately ensure the quality of software delivered to end-users.

In a conventional approach, the list of scenarios that would be impacted due to a particular code change for an application may be determined by an experienced person and/or a person with knowledge of an enterprise's system, and production data may then be manually generated by running the application. As such, because a comprehensive list of all of the production scenarios may not be documented, regression scripts in such arrangements are limited to particular scenarios known to a limited number of persons or operators (e.g., the experienced person). Moreover, scenarios will become outdated release after release, since new scenarios will not be captured after every release. Furthermore, manual effort may be continually needed to generate the production data according to scenarios that may be given by an enterprise.

To address the deficiencies of this conventional approach, the computing platform under the CL/CI approach may generate unique or independent scenarios from production data using continuous machine learning techniques, and may use the production data to execute the unique or independent scenarios using a continuous integration tool. Accordingly, by performing continuous machine learning in conjunction with continuous integration, scenarios will not be outdated (e.g., after a new release or update is implemented) as they will be generated automatically on a regular basis, any new scenarios will be captured automatically, and manual effort for maintaining and/or generating the data for testing a particular release may be eliminated or reduced.

Using the CL/CI approach, the computing platform may extract production data from an application (e.g., customer run transactions), process the production data (e.g., remove PII and convert deep hierarchical JSON data to a flat file), and apply machine learning techniques to the data (e.g., exploratory data analysis, dimensionality reduction, standardization, clustering, and data visualization, as discussed in greater detail below). In turn, the computing platform may then utilize the resulting information (e.g., clusters representing unique or independent scenarios) to run automation scripts to continuously build and run tests on new code (e.g., using TestCafe®), and to commit and integrate new code changes (e.g., using a Jenkins pipeline). The computing platform may receive and output results of the CL/CI process that validate whether a particular release with the new code changes (e.g., version of an application) performs as expected or desired.

Figure 1B:
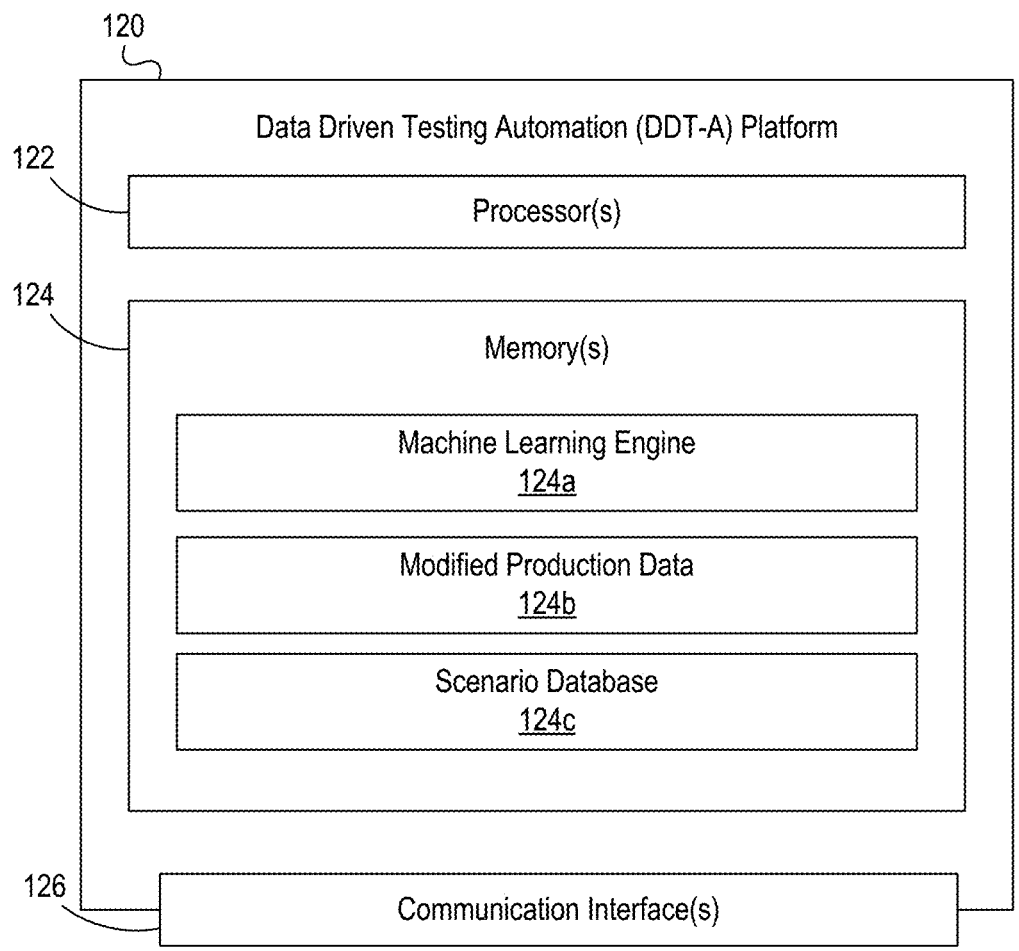

FIGS. 1A and 1B depict an illustrative computing environment for automated data driven testing using continuous machine learning combined with continuous integration in accordance with one or more example embodiments. Referring to FIG. 1A, computing environment 100 may include one or more computer systems. For example, computing environment 100 may include Data Driven Testing Automation (DDT-A) platform 120 (e.g., a developer machine), application server 130, continuous integration or automation server 140, and one or more user terminals 150, 160.

Network 110 provides communications between the various entities in computing environment 100, such as DDT-A platform 120, application server 130, continuous integration server 140, user terminal 150, and/or user terminal 160. Network 110 may be a shared, public, or private network and encompass a wide area or local area. Further, network 110 may be implemented through any suitable combination of wired and/or wireless communication networks. By way of example, network 110 may be implemented through a wide area network (WAN), local area network (LAN), an intranet, or the internet.

As illustrated in greater detail below, DDT-A platform 120, connected to network 110, may include one or more computing devices configured to perform one or more of the functions described herein. For example, DDT-A platform 120 may include one or more computers (e.g., laptop computers, desktop computers, servers, or server blades). In one or more instances, DDT-A platform 120 may be configured to perform continuous machine learning and continuous integration techniques in analyzing production data to identify one or more independent scenarios (e.g., scenarios associated with customizing one or more insurance products via a customer-facing application) and/or validate a version of an application based on the one or more independent scenarios. Additionally, DDT-A platform 120 may dynamically update scenarios on a regular basis as software updates are made. As a result, new scenarios will be captured automatically. In one or more instances, the DDT-A platform 120 may be associated with an organization or entity (e.g., an insurance agency, or the like).

Application server 130, connected to network 110, may include a CPU 132 and a memory 134. Software loaded into memory 134 from, for example, a disk drive (not shown) at the direction of CPU 132 may be used to implement a customer-facing application in a manner consistent with various embodiments of the present invention. For example, the software may execute instructions for analyzing customer data and to form customized insurance product packages. In addition, memory 134 may store, for example, a database (not shown) of customer data.

Terminals 150, 160 allow a user to exchange information with application server 130. Terminals 150, 160 may be any type of appropriate device for communicating with application server 130 over network 110. For example, terminal 150 may be a personal digital assistant running a program for communicating with application server 130, while terminal 160 may be a desktop type computer running a web browser for communicating with application server 130 via the internet.

Users may access application server 130 via network 110 to customize an insurance product (e.g., automobile, home, motorcycle, off-road vehicle, renters, and/or life insurance) through a web browser running on, for example, terminal 160. A website may include options to provide information or to fill out an application, and may present the user with a series of screens prompting the user to make various selections. The user may make appropriate selections to customize the insurance product.

Continuous integration (CI) server 140 connected to network 110, provides a framework to trigger and orchestrate the tools which build and test committed code. CI server 140 may report on the results and store output. In some instances, the CI server 140 implements a continuous integration tool (e.g., Jenkins). The CI server 140 may be used to test a version, release, task, or component of an application. The CI server 140 may implement a pipeline (e.g., series of steps) that brings an application from source code to deployment to customers. DDT-A platform 120 may trigger, without user input or manual intervention, an automation cycle on the CI server to build and test changes made to a version of an application. For example, test cases are fed into automation scripts and user interfaces are tested accordingly. The automation scripts may simulate user actions relating to execution of an application process.

In one or more arrangements, DDT-A platform 120, application server 130, continuous integration server 140, user terminal 150, user terminal 160, and/or the other systems included in computing environment 100 may be any type of computing device capable of and configured for receiving a user interface, receiving input using the user interface, and communicating the received input to one or more other computing devices. For example, DDT-A platform 120, application server 130, continuous integration server 140, user terminal 150, user terminal 160, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of DDT-A platform 120, application server 130, continuous integration server 140, user terminal 150, and user terminal 160 may, in some instances, be special-purpose computing devices configured to perform specific functions.

Referring to FIG. 1B, DDT-A platform 120 may include one or more processors 122, memory 124, and communication interface 126. A data bus may interconnect processor 122, memory 124, and communication interface 126. Communication interface 126 may be a network interface configured to support communication between DDT-A platform 120 and one or more networks (e.g., network 110). Memory 124 may include one or more program modules having instructions that when executed by processor 122 cause DDT-A platform 120 to perform one or more functions described herein and/or one or more databases that may store and/or otherwise maintain information which may be used by such program modules and/or processor 122. In some instances, the one or more program modules and/or databases may be stored by and/or maintained in different memory units of DDT-A platform 120 and/or by different computing devices that may form and/or otherwise make up DDT-A platform 120. For example, memory 124 may have, store, and/or include machine learning engine 124a, modified production data 124b, and a scenario database 124c. DDT-A platform 120 may have instructions that direct and/or cause DDT-A platform 120 to execute continuous machine learning techniques, as discussed in greater detail below. Modified production data 124b and scenario database 124c may store information used by machine learning engine 124a and/or DDT-A platform 120 in performing cluster analysis, validating a version of an application, and/or in performing other functions. Machine learning engine 124a may have instructions that direct and/or cause the DDT-A platform 120 to set, define, and/or iteratively refine parameters used by the DDT-A platform 120 and/or other systems in the computing environment 100.

Figure 2A:
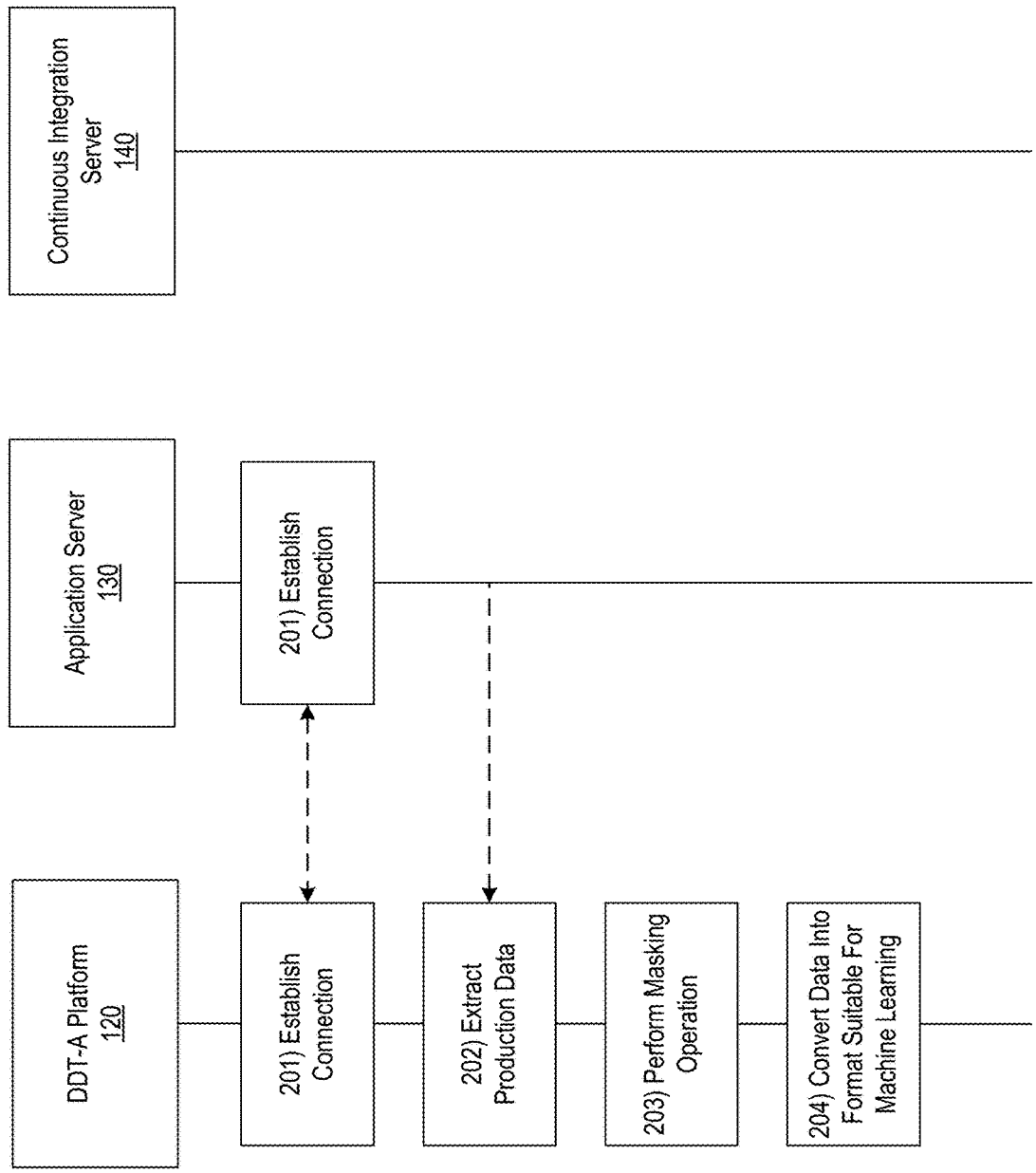
Figure 2C:
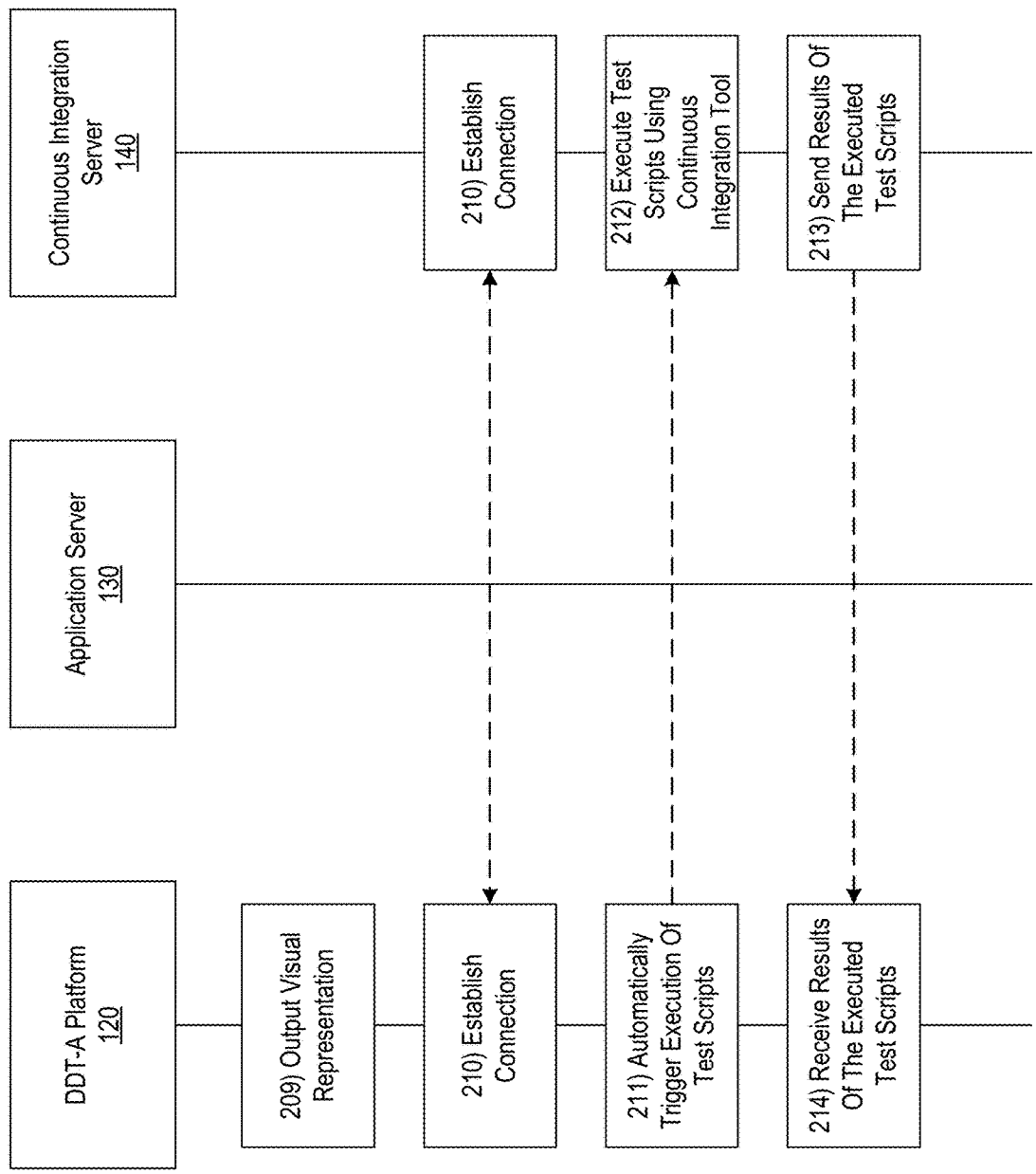

FIGS. 2A-2C depict an illustrative event sequence for automated data driven testing using continuous machine learning combined with continuous integration in accordance with one or more example embodiments. Referring to FIG. 2A, at step 201, the DDT-A platform 120 may establish a connection with the application server 130. In some instances, the DDT-A platform 120 may establish a first wireless data connection with the application server 130 to link the DDT-A platform 120 to the application server 130. In some instances, the DDT-A platform 120 may identify whether a connection is already established with the application server 130. If a connection is already established with the application server 130, the DDT-A platform 120 might not reestablish the connection. If a connection is not already established with the application server 130, the DDT-A platform 120 may establish the first wireless data connection as described herein.

At step 202, the DDT-A platform 120 may extract production data (e.g., from a database). In some instances, the DDT-A platform 120 may extract production data from application server 130. In some instances, in extracting the production data, the DDT-A platform 120 may receive production data associated with customer run transactions. In one or more instances, the DDT-A platform 120 may extract the production data via the communication interface 126.

At step 203, the DDT-A platform 120 may perform a masking operation on the production data received at step 202 to create modified production data. For example, the DDT-A platform 120 may remove PII from the production data. At step 204, the DDT-A platform 120 may convert the modified production data into a format suitable for machine learning. For example, the DDT-A platform 120 may convert the modified production data into a flat file. In general, a flat file refers to a data file that contains records with no structured relationships among the records (e.g., a plain text file or a binary file).

Referring to FIG. 2B, at step 205, the DDT-A platform 120 may perform machine learning steps on the modified production data to generate one or more independent scenarios for development testing. In one or more instances, the DDT-A platform 120 performs the machine learning steps of: exploratory data analysis at step 205, dimensionality reduction at step 206, data standardization at step 207, and/or clustering at step 208, as discussed in greater detail below. In one or more arrangements, at step 209, the DDT-A platform 120 may output a visual representation of the resulting cluster(s) of data from the clustering performed at step 208. In one or more instances, the resulting cluster(s) represent one or more independent scenarios. In one or more instances, the visual representation of the resulting cluster(s) may be displayed on a display screen of the DDT-A platform 120.

Referring to FIG. 2C, at step 210, the DDT-A platform 120 may establish a connection with the continuous integration server 140. In some instances, the DDT-A platform 120 may establish a second wireless data connection with the continuous integration server 140 to link the DDT-A platform 120 to the continuous integration server 140. In some instances, the DDT-A platform 120 may identify whether a connection is already established with the continuous integration server 140. If a connection is already established with the continuous integration server 140, the DDT-A platform 120 might not reestablish the connection. If a connection is not already established with the continuous integration server 140, the DDT-A platform 120 may establish the second wireless data connection as described herein.

At step 211, the DDT-A platform 120 may automatically trigger execution of test scripts at the continuous integration server 140. In some instances, the DDT-A platform 120 may automatically trigger execution of test scripts that simulate user actions relating to execution of an application process.

For example, the DDT-A platform 120 may automatically trigger execution of test scripts associated with the one or more independent scenarios, generated from the clustering at step 208, for testing the application using the modified production data. In turn, at step 212, the continuous integration server 140 may execute (e.g., by a test execution engine) test scripts using a continuous integration tool, as discussed in greater detail below.

At step 213, the continuous integration server 140 may send results of the executed test scripts to the DDT-A platform 120, which receives the results at step 214. In some instances, the results of the executed test scripts indicate whether a version of the application performs as expected or desired. In some instances, the DDT-A platform 120 may receive notification of one or more defects found during the execution of the test scripts. Subsequently the event sequence may end.

Figure 3:
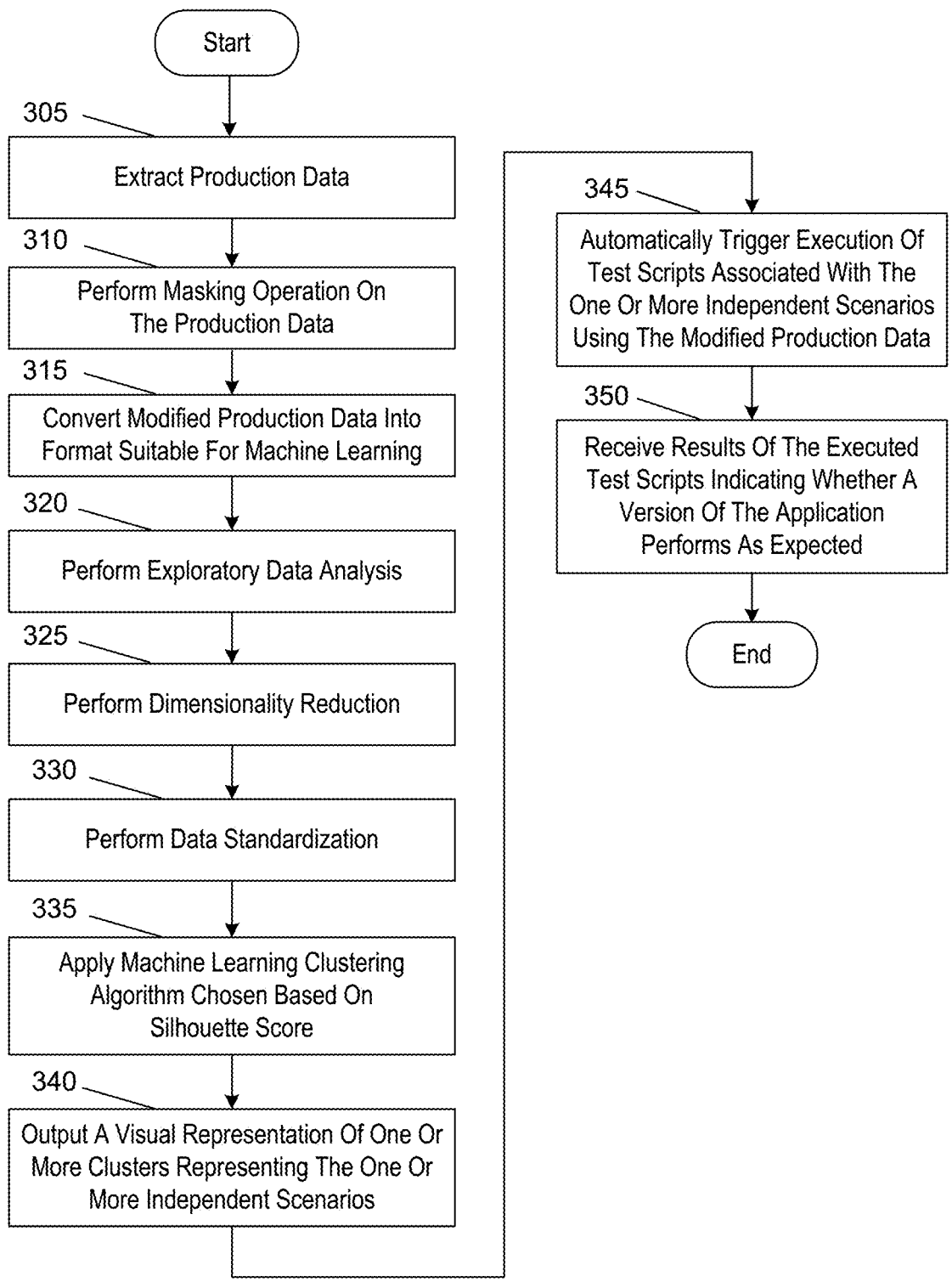
FIG. 3 depicts an illustrative method for automated data driven testing using continuous machine learning combined with continuous integration in accordance with one or more example arrangements discussed herein.
Figure 4:
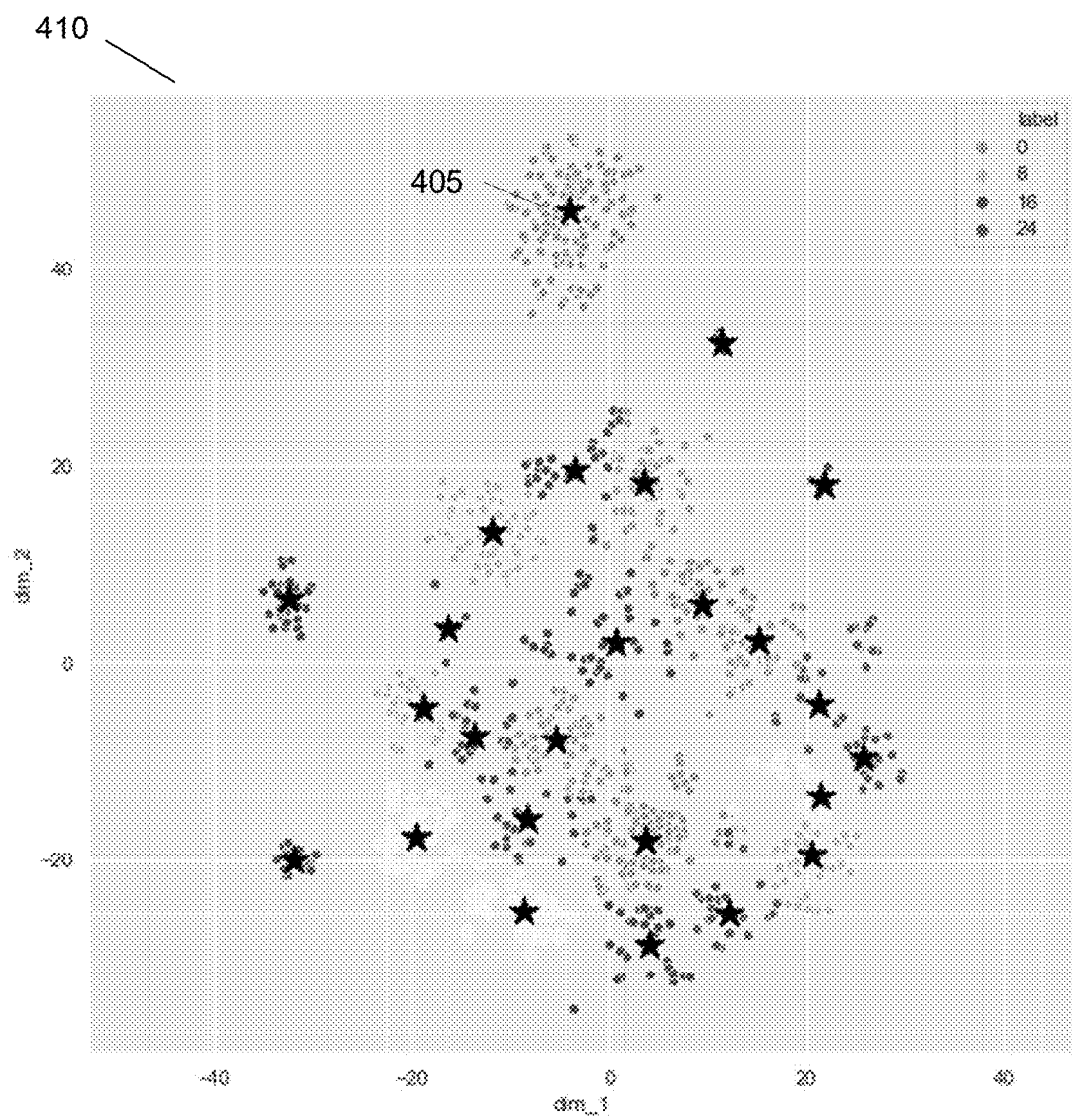
FIG. 4 depicts an illustrative visualization for automated data driven testing using continuous machine learning combined with continuous integration in accordance with one or more example arrangements discussed herein.

FIG. 3 depicts an illustrative method for automated data driven testing using continuous machine learning combined with continuous integration in accordance with one or more example embodiments. FIG. 4 depicts an illustrative visualization for automated data driven testing using continuous machine learning combined with continuous integration in accordance with one or more example embodiments.

Referring to FIG. 3, initially, at step 305, a computing platform having at least one processor, a communication interface, and memory may extract production data from user interaction with an application. In one or more instances, the application may include a plurality of fields for user input. The application may be a customer-facing application comprising a plurality of products. For example, the application may be an online shopping cart application where customers can obtain quotes for and purchase various insurance products. In one or more instances, production data associated with the application may be user inputs that are identified and stored in a database. Data extracted from the database may use a defined JavaScript Object Notation (JSON) format.

At step 310, the computing platform may perform a masking operation on the received production data to create modified production data. The production data may include personally identifiable information (PII) that can identify an individual (e.g., customer data). In one or more instances, the masking operation includes removing PII from the production data. The PII may include a user's first name, last name, social security number, driver's license, credit card information, and the like. This user identifying information embedded in the customer data can be cryptographically masked or removed. At step 315, the computing platform may convert the modified production data into a format suitable for machine learning (e.g., from the hierarchical JSON format into a flat file database format).

Next, the computing platform may generate one or more independent scenarios using continuous machine learning (ML) at steps 320-340. In some instances, the machine learning process includes, but is not limited to, performing exploratory data analysis at step 320, dimensionality reduction at step 325, and/or data standardization at step 330 on the modified production data. Exploratory data analysis may be used to analyze the data to summarize its main features (e.g., when datasets are large). Among other things, exploratory data analysis may also be used to ensure the validity of the data before further processing. Dimensionality reduction may be used to reduce the number of features under consideration (e.g., from hundreds of columns of features to 26 columns of features). In some instances, the features may include, for example, features relating to discounts for renter's insurance such as the presence of smoke detectors, fire extinguishers, storm shutters, etc.). Data standardization may be used to convert the data to a numeric format for machine learning.

At step 335, the computing platform may apply a ML clustering algorithm to the resulting modified production data from step 330. In one or more arrangements, the ML clustering algorithm divides the modified production data into one or more clusters of data representing the one or more independent scenarios. A variety of ML clustering techniques may be used, such as k-means clustering, clustering with Gaussian mixture models (GMM), mean shift clustering, and hierarchical (e.g., agglomerative) clustering. In some instances, the ML clustering algorithm to be applied to the data is determined based on a cluster evaluation metric such as a silhouette ratio score. A silhouette ratio score measures consistency within clusters of data, for example, how well each object in a cluster has been classified. The silhouette ratio score represents the percentage of clusters in a clustering result with a silhouette score above a predefined threshold. The higher the percentage, the better the quality of the overall clustering result.

At step 340, the computing platform may output a visual representation (e.g., plot) of the one or more clusters of data on a display screen, with each cluster representing an independent scenario. In some instances, the visualization may display the data in a two-dimensional graph on a graphical user interface similar to graphical user interface 410, which is shown in FIG. 4, providing a way for a user (e.g., developer) to assess the optimal number of clusters visually. Each cluster present in the visualization has a central point (centroid). In some instances, clusters and their centroids may be marked by stars 405. The number of cluster centroids presented indicate the optimal number of unique or independent scenarios that, when tested, would ensure that an application functions and performs as designed.

In a non-limiting example, as shown in FIG. 4, the computing platform obtains a sample of 1000 renters records from an application (e.g., one of the product lines offered by a customer-facing application), the computing platform runs machine learning clustering algorithms (e.g., k-means, GMM, mean shift, and agglomerative) and obtains scoring ranges for each algorithm (e.g., a silhouette ratio score), and the clustering graph 410 is generated using the clustering algorithm with the highest silhouette ratio score. In this case, the mean shift clustering algorithm having the highest silhouette ratio score was applied to the data. The optimal number of clusters formulated from the data is indicated by stars 405. Each cluster represents one or more independent scenarios. From the graph, the computing platform may determine that out of the 1000 records/transactions from user interaction with the customer-facing application, running just 25 unique scenarios (e.g., records/transactions) would validate that the renters' application, including any changes or updates to the application (e.g., a new user interface box), would perform as expected or desired in production and the application would not break. In this way, issues in production may be reduced.

Returning to FIG. 3, at step 345, the computing platform may automatically trigger execution of test scripts (e.g., by a test execution engine/continuous integration tool) associated with the one or more independent scenarios for testing the application using the modified production data.

At step 350, the computing platform may receive results of the executed test scripts indicating whether a version of the application performs as expected or desired. In some instances, the computing platform receives notification of one or more defects found during the execution of the test scripts. For example, an automation server may pull the latest version of the application code, run various tests on the code, and automatically report results of the code analysis.

Accordingly, one or more aspects of the systems and methods described herein may be used to address technical difficulties associated with development testing. By implementing the CL/CI approach, the process of generating unique production scenarios for testing may be increasingly automated, thus conserving time traditionally spent in manual generation. Furthermore, production scenarios may be updated without specialized domain knowledge and ultimately used to validate software with increased accuracy, and ultimately to provide increased software development, testing, and deployment efficiency and effectiveness.

It should be understood that the steps described in the illustrative method may be performed in any order without departing from the scope of the disclosure. Furthermore, it should be understood that any of the steps described in the illustrative method above may be performed automatically, without being requested by a user input.

It should be understood that while the systems and methods described herein in the illustrative system diagrams and methods are described in the context of insurance sales applications, the systems and methods described herein may be applied to any number of other fields and applications to assist with software development testing, or the like based on machine learning without departing from the scope of the disclosure.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims may occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A computing platform, comprising:
   at least one processor;
   a communication interface communicatively coupled to the at least one processor; and
   memory storing computer-readable instructions that, when executed by the at least one processor, cause the computing platform to:
   extract production data from user interaction with an application;
   generate unique or independent scenarios from the production data using machine learning;
   trigger, using a continuous integration tool and the production data, execution of the unique or independent scenarios to continuously build and run tests on an updated version of the application; and
   receive results of the executed unique or independent scenarios indicating whether the updated version of the application performs as expected, wherein the unique or independent scenarios are updated automatically with each updated version of the application, by performing continuous machine learning in conjunction with continuous integration.

2. The computing platform of claim 1, wherein the computing platform is further caused to perform a masking operation on the production data comprising removing personally identifiable information from the production data.

3. The computing platform of claim 1, wherein the machine learning further includes performing exploratory data analysis, dimensionality reduction, and data standardization on the modified production data.

4. The computing platform of claim 1, wherein the memory stores additional computer-readable instructions that, when executed by the at least one processor, cause the computing platform to output a visual representation of the one or more clusters of data on a display screen.

5. The computing platform of claim 1, wherein the clustering algorithm to be applied is determined based on a silhouette ratio score.

6. The computing platform of claim 1, wherein the production data includes user input data associated with one or more insurance products.

7. The computing platform of claim 1, wherein the computing platform is further caused to convert the production data into a format suitable for machine learning.

8. The computing platform of claim 1, wherein the unique or independent scenarios simulate user actions relating to execution of an application process.

9. The computing platform of claim 1, wherein the computing platform is further caused to convert the production data into a flat file format.

10. The computing platform of claim 1, wherein the memory stores additional computer-readable instructions that, when executed by the at least one processor, cause the computing platform to receive notification of one or more defects found during the execution of the unique or independent scenarios.

11. A method comprising:
at a computing platform comprising at least one processor, a communication interface, and memory:
extracting, from a database, production data reflecting user interaction with an application;
generating unique or independent scenarios from the production data using machine learning;
triggering, using a continuous integration tool and production data, execution of the unique or independent scenarios to continuously build and run tests on an updated version of the application; and
receiving results of the executed unique or independent scenarios indicating whether the updated version of the application performs as expected, wherein the unique or independent scenarios are updated automatically with each updated version of the application, by performing continuous machine learning in conjunction with continuous integration.

12. The method of claim 11, further comprising applying a clustering algorithm to the modified production data, which comprises performing one or more of exploratory data analysis, dimensionality reduction, or data standardization on the modified production data.

13. The method of claim 11, wherein the computing platform is further caused to perform a masking operation on the production data comprising removing personally identifiable information from the production data.

14. The method of claim 11, wherein the unique or independent scenarios simulate user actions relating to execution of an application process.

15. The method of claim 11, wherein applying the clustering algorithm comprises applying the clustering algorithm based on a silhouette ratio score.

16. The method of claim 11, wherein the production data includes user input data associated with one or more insurance products.

17. The method of claim 11, wherein the production data includes customer input data.

18. The method of claim 11, further comprising converting the production data into a flat file format.

19. The method of claim 11, further comprising applying a clustering algorithm to the production data, wherein the clustering algorithm divides the modified production data into one or more clusters of data representing the unique or independent scenarios, and wherein the clustering algorithm comprises at least one of a k means clustering algorithm, Gaussian mixture models clustering algorithm, a mean shift clustering algorithm, and an agglomerative hierarchical clustering algorithm.

20. One or more non-transitory computer-readable media storing instructions that, when executed by a computing platform comprising at least one processor, a communication interface, and memory, cause the computing platform to:
extract production data from user interaction with an application;
generate unique or independent scenarios from the production data;
trigger, via a continuous integration tool and the production data, execution of the unique or independent scenarios to continuously build and run tests on one or more updated versions of the application; and
receive results of the executed unique or independent scenarios indicating whether the one or more updated versions—of the application performs as expected, wherein the unique or independent scenarios are updated automatically with each updated version of the application, by performing continuous machine learning in conjunction with continuous integration.

* * * * *